United States Patent
Taminaga

[15] 3,636,808
[45] Jan. 25, 1972

[54] MATERIAL-CUTTING MACHINE

[72] Inventor: Hiroshi Taminaga, 78, Matsugaoka, Kanagawa, Yokohamashi, Kanagawa-ken, Japan

[22] Filed: Mar. 17, 1971

[21] Appl. No.: 125,233

Related U.S. Application Data

[62] Division of Ser. No. 806,646, Mar. 12, 1969, Pat. No. 3,596,650.

[52] U.S. Cl. ..................... 83/514, 83/554, 83/617, 83 639
[51] Int. Cl. ........................... B26d 5/12, B26d 11/00
[58] Field of Search ................... 83/513–519, 554, 83/617, 639

[56] References Cited

UNITED STATES PATENTS

| | | | |
|---|---|---|---|
| 897,048 | 8/1908 | Astfalck | 83/639 UX |
| 3,485,131 | 12/1969 | Brolund | 83/516 X |

Primary Examiner—James M. Meister
Attorney—Blum, Moscovitz, Friedman & Kaplan

[57] ABSTRACT

An apparatus for cutting off metallic material and the like with the application of shearing force which comprises cutting means including a cutting tool which is actuated by the energy in the form of fluid pressure conveyed instantaneously through fluid from a high-pressure generator, and at least one of other means, namely, work-holding means capable of holding the work with an adequately strong force, compression means capable of exerting a compressive force on the work in the direction normal to the shearing direction, and means for regulating the speed at which the cutting tool operates, said cutting means and said one of means being combined together to constitute cutting functional means which can instantaneously cut off a work of metallic material or the like with a great composite shearing force, not with the simple shearing force of conventional shears.

4 Claims, 8 Drawing Figures

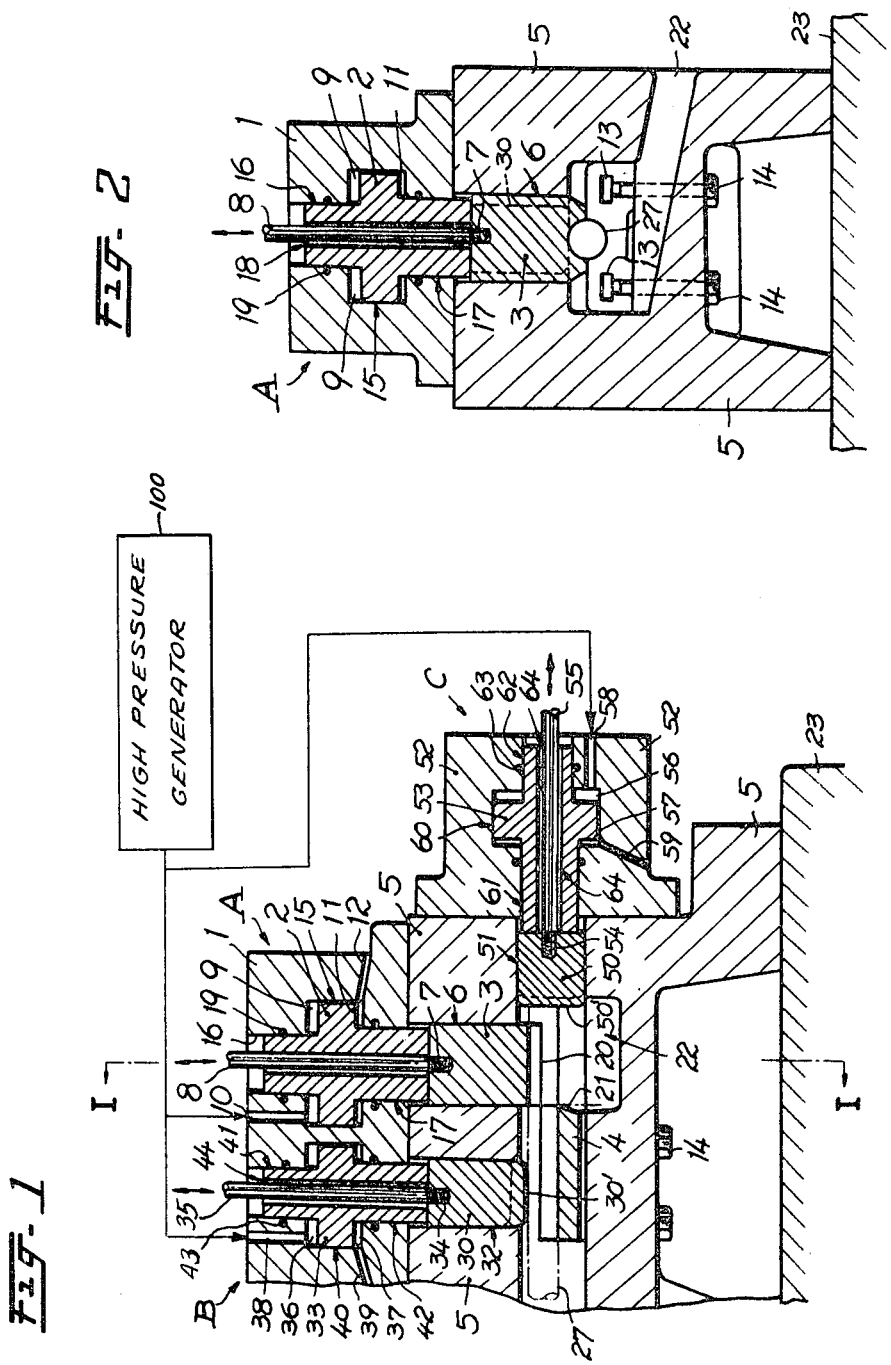

MATERIAL-CUTTING MACHINE

BACKGROUND OF THE INVENTION

This application is a division of my pending application, Ser. No. 806,646, filed Mar. 12, 1969 U.S. Pat. No. 3,596,650 for "Material Cutting Machine."

DETAILED EXPLANATION OF THE INVENTION

This invention relates to an apparatus for cutting work of metallic material such as bar, rod, etc., of mild steel, or the like, by a shearing action.

Generally, it is known that in cutting off a metallic material by shears, the higher the cutting speed above a certain level the smaller the shearing resistance to be encountered. In other words, ordinary metallic materials have elastic plasticity exhibiting such tendencies when worked with strains and that upon arrival at certain cutting speeds which vary with the materials, those metallic materials become extremely brittle and easy to cut. Also known is the fact that a combination of shearing force and compressive force gives a smoother sheared surface than that obtained by cutting merely with shearing force.

In cutting a metallic material by means of a tool, it is desired that the sectional surfaces obtained by the cutting be as smooth and uniform as possible. Usually in a shearing operation, where the work is so held as to leave one end free and simple shearing force is applied, the resistance being afforded by the work increases sharply as the tool cuts in the work. When the resistance has reached a certain limit, the tool tip induces a crack in the work. With the advance of the tool the crack grows until the work is completely cut off. It is usually inevitable that, depending on the process of cutting employed, the sheared edges are so shaped that the surface of work portion left behind induces a crack and is formed with downward burr and the sheared surface of fracture has upward burr.

These upward and downward burrs not merely deform the original sectional profile of the work but also make it impossible to provide uniform dimensions and weight. It may necessitate additional cutting or machining work depending on the type of subsequent working step intended. Also, while the materials become extremely brittle and easy to cut with an increase of the cutting speed beyond a certain level, e.g., over 20 m./sec. for mild steel or the like, thus providing a smooth sheared surface or fracture, it is actually difficult with conventional cutting machines to increase the cutting speeds in this way beyond certain values because of various mechanical limitations involved. If this is possible, the equipment will necessarily be large and costly and involve complicacy in operation to practical and economical disadvantages. Therefore, it has been difficult to obtain blanks with smooth and crack-free sheared surfaces. The present invention is directed to the elimination of the foregoing disadvantages of the conventional cutting machines.

In cutting a metallic material, an increase in the distortional velocity is accompanied by a rise of the yielding point and an increase of stress during deformation, and the material becomes very brittle and easy to cut at a certain cutting speed which varies with the material.

One object of this invention is to provide a cutting machine which accomplishes the cutting operation with great ease and accuracy as the above tendencies of metallic materials are fully taken advantage of and the speed of shearing tools is adjusted to an optimum cutting speed which depends on the material to be handled, so that the work can be shorn to a blank free from any downward burr or from any crack on the sheared surface.

It is another object of the present invention to obtain a cutting machine whereby the individual blanks can be cut off in a state uniform in weight and remarkably reduced in material deformation and the sheared surface made smooth and even across the sheared surface.

Another object is to ensure improved efficiency and simplicity of the cutting operation, as well as the provision of fine and smooth sheared faces which retain the original sectional contour and are free from so-called downward burr and upward burr, by exerting a great composite shearing force to the work and instantaneously cutting it off while avoiding any springback of the work due to the cutting and subjecting the work to a great compressive force in the axial direction thereof in order to inhibit the development of downward burr.

Still another object is to provide a small-size lightweight and economical cutting machine capable of turning out blanks of uniform dimensions efficiently within a short period of time.

Yet another object is to accomplish the material-cutting operation accurately with an optimum cutting speed and shearing force by providing instantaneously a great amount of power to the work through the utilization of an impact, ultra-high-pressure fluid by the use of a relatively small machine.

A further object is to provide a material-cutting machine which can repeat the cutting cycle continuously and which machine provides for the improvement of the durability of the components, in the safety and economy of the cutting operation, and further adapted for quantity production.

Another object is to provide an impact hydraulic cutting machine which can give sheared blanks adapted to be used as such without any aftertreatment or additional finish working, with a considerable saving in the working cost, and which can also readily accomplish the cutting of the materials that otherwise involve many difficulties in shearing.

The technical subject matter of the present invention for achieving the aforesaid objects thereof resides in a material-cutting machine characterized in that cutting means, including a cutting tool, is so constructed as to be actuated instantaneously by the energy from an impact hydraulic pressure generator which is transmitted in the form of hydraulic pressure through a hydraulic fluid, the cutting means being associated with work-holding means for holding the work fed into the cutting position and compression means adapted to exert a compressive force on the work in the direction at right angles to the shearing direction, so that a metallic material can be cut off by the functions of those means instantaneously at a high speed.

An important feature of the present invention is that the material-cutting machine thereby provided comprises fluid actuating means, a work-cutting tool to be actuated by the fluid being equipped with means for adjusting and modifying the kinetic mass, a work receiver located opposite to the cutting tool and which will control the shearing action, and means for adjusting the velocity with which the cutting tool moves, the fluid in the fluid actuating means for the cutting tool being adapted to be subjected momentarily to a high fluid pressure so that the tool can cut down the work placed on said work receiver.

Another important feature is that the material-cutting machine provided by the present invention is such that the cutting means including the cutting tool is combined with any one or a plurality of the other means, namely, the work-holding means to hold the work fed onto the work receiver with an adequately strong force, compression means for exerting a compressive force to the work in the direction at right angles to the plane of sheared face to be formed, and means for regulating the speed with which the cutting tool moves, the components of the above combination as the cutting functional means being so arranged as to be actuated instantaneously by the energy from an impact hydraulic pressure generator that is transmitted in the form of a hydraulic pressure through the hydraulic fluid.

It is a further feature to provide a cutting machine which comprises hydraulically operable mechanism, a work receiver which can govern the shearing action opposite to a material-cutting tool to be hydraulically operated, and motion speed regulating means consisting of a pneumatically operable piston and a hydraulic piston adapted to move in a hydraulic cylinder being associated with the cutting tool aside from he hydraulically operable mechanism to actuate the work-cutting tool, said machine being adapted to be arranged in a plurality of unit for interlocked operation so that the hydraulic pressure in said hydraulic cylinder can be utilized as the actuating input for the fluid actuating means for the cutting tool of the ensuing machine, thus enabling a plurality of workpieces to be cut off simultaneously.

According to the present invention, the work is cut off as it is subjected to a shearing force instantaneously at a high speed under the functions of the individual components. The shearing force involved is not a simple one but it acts as a composite shearing force, which can give smooth and crack-free sections as the sheared surfaces.

In cutting a material by shears, the machine of the present invention can hold the work to be cut with the combined action of a drop of shearing resistance due to high-speed shearing, compression and shearing and also with ample force, exert a compressive force to the work in the direction normal to the plane of shearing, and positively avoid the development of downward burr and upward burr to cut off the work true to the original section, free from any distortion in the dimensions or configuration.

Even a material of relatively high elastic plasticity, e.g., mild steel, can be easily and positively cut off to a fine and smooth sheared surface. Depending on the material of the work, the working speed of the cutting tool can be conveniently adjusted to an optimum cutting speed. The deformation of material at the time of shearing is remarkably reduced and the cut end presents a smooth and even surface.

The present invention permits a most efficient cutting operation within a very short period of time and with only a fraction of the total kinetic energy of the cutting tool, so that the remainder of the energy can be utilized for the other purposes. Thus, not only an extremely economical operation is made possible, but also additional convenience and economy are attained because no additional working process is required to secure the desired dimensions and weight.

Under the invention, the shearing speed can be increased to a high level, and the materials become extremely brittle and easy to cut. Accordingly, the tool life is extended with adequate resistance to wear and impact.

Since the cutting edge construction is such that the upper and lower cutting blades are separated along a horizontal plane, including the axis of the work, and can be simply formed to the same dimensions and shape as those of the rod, bar or the like material to be cut off, it is possible to produce an enormous amount of shearing work as desired with an impact, despite a short total shearing stroke, and thus achieve a material improvement in the shearing efficiency.

Moreover, according to the present invention, an impact hydraulic pressure can be utilized to exert a very strong force to the cutting means and work-holding means and also to the compression means to that a composite shearing force can be applied to the work for the cutting purpose. This makes it possible to perform the cutting operation in an effective way, obtain a great shearing force from a relatively small apparatus, and repeat the cutting cycles continuously. The durability and safety thus ensured of the cutting machine represents significant improvements over the conventional equipment.

Regardless of the magnitude of energy made available for the cutting purpose, the speed of the cutting tool with respect to the work being cut can be adjusted to a suitable value depending on the particular material of the work. This renders it easy to avoid such defects as the deformation, the crack of the work, and the downward burr of the cut end of the work, which otherwise occur frequently on the conventional cutting machines. Among other practical advantages are a remarkable improvement in the dimensional accuracy achieved, the need of no aftertreatment for finishing, compactness of the equipment as a whole and full utilization of the high fluid pressure for the cutting functional means at an economic advantage.

It is further possible, in accordance with the present invention, for the cutting functional means to be driven through the medium of high-pressure hydraulic fluid, to eliminate all of the mechanical troubles and inconveniences of the conventional units. This is highly contributory to the provision of robust, rugged and durable equipment. If a liquid such as water is used as the medium for transmitting the energy from a high-pressure source to the cutting functional means, the individual means can be allowed to function with certain time lags in view of their respective functions desired. The time lags or differences may be varied over a great and extensive range and with utmost delicacy. In this way, every factor which may have adverse effects upon the simplicity of the cutting operation and upon the accuracy of the pieces so cut off can be effectively eliminated or made up for favorably.

Although the present invention is described hereunder in connection with the embodiments thereof, it should be obvious that this invention is not limited thereto, but means useful for improving the working facility for material cutting and for improving the durability and economy of the components may be suitably incorporated therein.

In the accompanying drawings showing embodiments of the present invention:

FIG. 1 is a vertical sectional view of an apparatus embodying the invention;

FIG. 2 is a sectional view taken along the line I—I of FIG. 1;

FIGS. 3-8 are views of other definite embodiments of the invention based on the embodiment of FIG. 1 modified without departing from the spirit of the invention, wherein FIG. 3 is a vertical sectional view of an apparatus equipped with motion speed regulating means;

FIG. 4 is a sectional view taken along the line II—II of FIG. 3;

FIG. 5 is a front view of a plurality of machines arranged for an interlocked operation;

FIG. 6 is a vertical sectional view of the embodiment of FIG. 1 as equipped with means for regulating and modifying the mass of the moving parts;

FIG. 7 is a sectional view taken along the line III—III of FIG. 6; and

FIG. 8 is a vertical sectional view of another embodiment which represents the embodiment of FIG. 1 plus other component parts.

Figure 6:
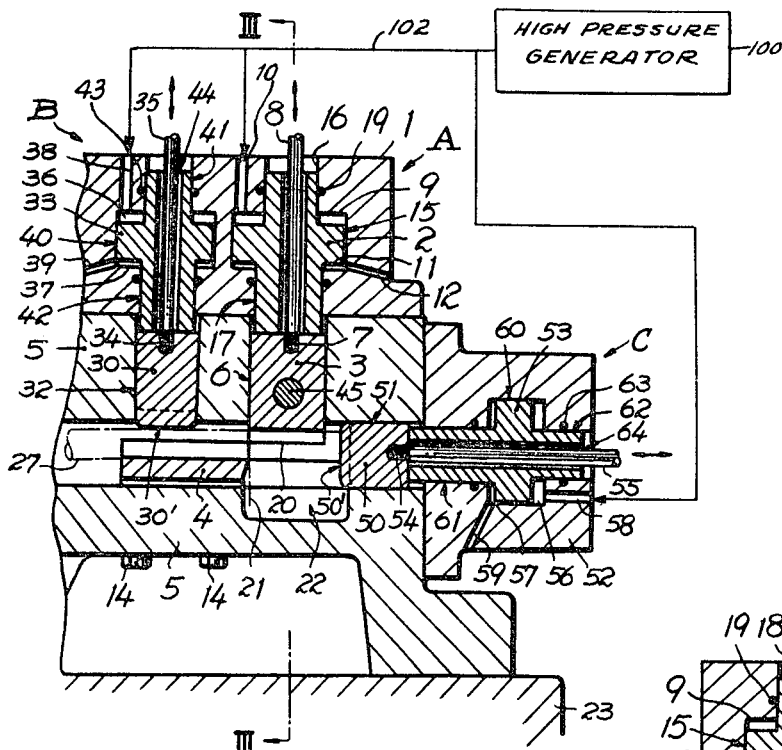

Details of these embodiments will be explained hereunder by reference to the accompanying drawings.

Referring specifically to FIGS. 1 and 2, a cylinder 1 of liquidtight, pressure-resistant type, is capable of being filled with water or other liquid. In this cylinder a piston 2 is slidably fitted as an actuating member. The piston 2 is accelerated in its motion by an impact hydraulic pressure from means to drive the piston at a high speed, e.g., an apparatus provided outside the cylinder 1 as an impact hydraulic pressure generator which momentarily produces a very high hydraulic pressure, with an impact as the liquid in the chamber is thereby compressed, whereby the cutting of the work is accomplished. For this purpose, cutting means A is provided which consists of a cutting blade 3 as a cutting tool and a work receiver 4 for shearing use. The machine comprises, in addition to this cutting means, work-holding means B for holding, with an adequately strong force, the work interposed between a work receiver 4 and cutting blade 3, and compression means C for exerting a compressive action to the work in the direction substantially at right angles to the shearing direction in which the cutting blade 3 works, that is, in the axial direction of the work.

The cutting blade 3 and work receiver 4 are provided in the form of upper and lower cutting blades separated along the horizontal plane, including the axis of the work, and are both so constructed as to conform to the dimensions and contour of the work to be shorn off. The receiver 4 is fixedly secured to a large and heavy base 5 which provides a huge intertial resistance. The cutting blade 3 is fitted in a guide hole 6 of the base in such a manner that it can slide up and down therein, and is connected to an operating rod through a connection 7 such as of a screw to such an arrangement that is adapted to be rammed by the piston 2 which moves in the cylinder 1.

An impact hydraulic pressure chamber 9 of this ramming piston is filled with a liquid such as water and is provided with a hydraulic fluid passage 10 in communication in terms of hydraulic pressure with an impact hydraulic pressure generator such as a hydropunch. An empty chamber 11 defined on the opposite side of the impact hydraulic pressure chamber 9, or on the underside of the piston 2, is communicated to the atmosphere through a communication passage 12. In the manner described, a hydraulically operable mechanism is constructed.

Work-holding means B includes a pressure chamber 30 for holding the work to be cut off with an adequately strong force and also includes a cylinder 31 and a piston 32 for holding the work, and has a construction similar to that of the hydraulically operable mechanism. This work-holding means B is arranged close to and parallel with the cutting means A and in the direction at right angles with these means A and B, compressions means C, which includes a compression member 50 for compressing the work in the axial direction and which is similar in construction to the hydraulically operable mechanism, is provided. Impact fluid passages of these cutting, work-holding and compression means are communicated to a common impact hydraulic pressure generator 100 along fluid transmission channels 102 so that work-holding, compression and cutting can be instantaneously accomplished.

The base 5, which carries the functional means of the compositions and constructions above described, is made as heavy as possible to provide a huge inertial resistance to the impact ramming for the cutting operation. The receiver 4 for shearing use also serves as the undercutting blade. As shown in FIG. 2, it has an arcuate surface on the top which is of the same radius as the work to be cut off, with the top end playing the role of a cutting edge. In such a manner as to provide an adequate clearance between itself and the cutting blade 3, the work receiver 4 is fixed to the base 5 with bolts 14 through under slots 13. The guide hole 6 for the cutting blade 3 is usually of a rectangular cross section so that it can define the moving direction of the blade and also absorb the horizontal force that the cutting blade gives during the cutting operation. As can be seen from FIG. 2, the cutting blade 3 is edged on the surface opposite to the latter.

With an operating rod 8 which is driven by an external means such as an air cylinder or hydraulic cylinder (not shown), the cutting blade 3 is moved up and down. The connection 7 of the operating rod 8 is represented by a screw. Specifically, this screw which directly couples the cutting blade 3 to the operating rod 8 is made loose with a large clearance or play in the thread engagement in such a manner as to avoid effectively the damaging of the operating rod 8 due to direct conveyance of the shearing impact from the cutting blade 3 to the operating rod 8.

The piston 2 is formed of an intermediate large-diameter columnar portion and upper and lower small-diameter columnar portions, the large-diameter portion fitting in a large-diameter cylindrical guide hole 15 provided in the cylinder 1 and the small-diameter portions in the upper and lower guides 16, 17 respectively, which are rendered liquidtight with seals 19 such as O- rings, so that the piston can slide up and down in the cylinder. The piston is also formed with a center bore 18 to permit the sliding motion of the operating rod 8 therethrough.

In the event the liquid in the impact hydraulic pressure chamber 9, formed in the guide hole 15 which receives the piston 2, leaks through the space between the piston and guide hole 15 into the empty chamber therebelow, the communication passage 12 can be utilized as the passage through which the leaking liquid is drained.

The pressure member 30 of the work-holding means B corresponds to the cutting blade 3 of the cutting means A, but differs from the latter in that it is flattened at the bottom 30', or is of the geometry conforming to the contour of the work to be cut off and is thus edgeless unlike the bottom of the cutting blade 3. The compression member 50 of the compression means C as functional means to compress the work in the axial direction in order to prevent downward burr and accomplish the cutting with a composite stress, is also edgeless and flat at the bottom 50', or its bottom is of the geometry conforming to the contour of the work to be handled. Both the work-holding means B and the compression means C have corresponding sets of component parts 30–44 and 50–64, which are identical with those of the cutting means A excepting the differences in the functions intended and in part of configurations, and hence the description thereof is omitted. It should be noted of course that the adjective expression "for the cutting means" is supplanted by an expression "for the work-holding means" or "for the compression means", whichever is applicable.

All of the hydraulic fluid passages of the machine, such as the passage 10, are in communication with the hydraulic pressure produced by a common impact hydraulic pressure generator, and are subjected to the same hydraulic pressure with slight time differences depending on the functions assigned.

Throughout the figures, reference numeral 20 indicates a space in which a work to be cut off is fed and placed. Other numerical designations include 21 for the cut end of the work, 22 for a discharge port for the workpiece so cut off, 23 for the base, 27 for the work to be cut off, 32 for a guide hole through which the pressure member 30 fits and slides, 34 for a connection for screw or the like, and 35 for an operating rod carried by the pressure member 30 and which is adapted to be driven from the outside. An impact hydraulic pressure chamber is indicated at 36, an empty chamber 37, and a hydraulic fluid passage 38 which hydraulically communicates to the impact hydraulic pressure generator. Other parts and portions are: a communication passage 39, a guide hole 40 for the piston 33, an upper piston guide 41, a lower piston guide 42, a seal 43, a bore 44 for the operating rod 35, a guide hole 51 so formed as to permit insertion and sliding of the compression member 50 therein, a cylinder 52, a piston 53 for compression purposes, a connection 54 as a screw, an operating rod 55, an impact hydraulic pressure chamber 56, an empty chamber 57, a hydraulic fluid passage 58, a communication passage 59 which is open to the atmosphere, a guide hole 60 for the piston 53, a front guide 61 for the piston, a rear piston guide 62, a seal 63 and a bore 64 for the operating rod 55.

The operation of the machine embodying the present invention is as follows. The cutting blade 3 of the cutting means A, the pressure member 30 of the work-holding means B, and the pressure member 50 of the compression means C are pulled backward by operating rods 8, 35, 55, respectively, and are in the fully receded positions where the empty chambers 11, 37 and 57, defined by the respective pistons, are reduced to naught, thus leaving a fully opened working space behind. A work is fed into this working space by means of a feeder (not shown) which is driven from an external source, and is paced on the work receiver 4. Then the operating rods 8, 35, and 55 are driven from the outside through air cylinders or hydraulic cylinders, so that the cutting blade 3, pressure member 30, and compression member 50 are pushed ahead to the points where they lightly touch the work. Next, water from a suitable source, such as the city waterline, is supplied to the impact hydraulic pressure chambers 9, 36, and 56 through fluid passages 10, 38, and 58, respectively, with the result that the pistons 2, 33, and 53 are urged forward into contact with the cutting blade 3, pressure member 30 and compression member 50.

Thereafter, feed water valves (not shown) are closed, and the hydraulic pressure from an impact hydraulic pressure generator such as a hydropunch is transmitted to the impact hydraulic pressure chamber 9, 36, and 55 via the fluid passages 10, 38 and 58. If the lengths of the fluid transmission channel 102 are suitably chosen, and the work-holding means B, compression means C and cutting means A are so arranged as to be subjected to the hydraulic pressure in the order mentioned with slight time differences or lags, the work can then be held in position with an enormous force, subjected to a huge compressive force axially and then to an instantaneous shearing force of the upper cutting blade 3. The work is thus cut off. The drop of shearing resistance due to high-speed shearing is coupled with improved cuttability attributable to the combination of compression and shearing, to give a crack-free, smooth sheared surface. The piece cut off rolls out through the discharge port 22 or the like which is suitably formed in the base 5. After the cutting operation, the procedure above described is reversed, and the upper cutting blade 3, work-holding pressure member 30, and compression pressure member 50 are brought back by the operating rods 8, 35, and 55, respectively. A cutting cycle has now been completed.

In the embodiment shown in FIGS. 3 and 4, ram hole 66 of a cylinder 65 communicated hydraulically to an impact hydraulic pressure generator in the same manner as described above is filled with a liquid, and a columnar ram 67 is slideably fitted in the ram hole 66 thereby constituting a hydraulically operable mechanism. The ram 67 is integrally formed with a head 69 adapted to carry detachable weights 68 which may be selected from a group of various sizes, and also with a cutting tool 70. Opposite to this integral combination and in a mating relationship there is provided a work receiver 4 on the base 23. A motion speed regulating mechanism E consists of a pair of assemblies, each including a piston 72, adapted to be moved up and down pneumatically in an air cylinder 71 directly coupled to a hydraulic piston 74 which moves within a hydraulic cylinder 73. Each assembly is fixed at one end of the air piston 72 to the head 69 through a connecting member 75. Each hydraulic cylinder 73 is formed with an opening 76 communicating to the atmosphere. In contact with the liquid in each hydraulic cylinder 73 a damper 77 such as a cylindrical shock absorber is provided. A material-cutting machine is thus completed.

In the embodiment being described, the work-holding means B and compression means C of the first embodiment are replaced by the means D for adjusting and modifying the mass of the moving parts as a shifting mechanism for the weights 68, and the motion speed regulating means E, respectively, to achieve the same purpose intended. The weights 68 arranged in combination of a plurality or a multiplicity of individual weights in the head 69 are detachably inserted into the head 69 as by threaded engagement, so that weight pieces of different sizes and weights may be used according to the necessity. Each air piston 72 is fastened securely to the connecting member 75 with a nut 78. The air cylinder 71 is formed with an inlet port 79 and an outlet port 80 for compressed air, which serve to move the air piston 72 in the cylinder 71 hydraulically. The opening 76 of the hydraulic cylinder 73 is suitably located, normally in communication with the atmosphere, so that the hydraulic piston 74 which has descended below the opening 76 can compress the liquid in the hydraulic cylinder 73.

The connection member 75 is equipped with positioning means, which consists of a fixed member 24 and a spring-loaded protrusion 25, said fixed member being formed with notches 26 adapted to engage with the protrusion. Since the notches 26 are formed at points corresponding to the ascended position of the head 69 and the position immediately before cutting, the protrusion 25 keeps the head 69 in position when the latter has come to either of the positions. The positioning means can support the total weight of the whole assembly of the vertically moving parts including the head 69 and maintain the same in either position. When a compressive pneumatic force is exerted on the air piston 72 or a hydraulic pressure is applied to the ram 67 to move either member upward or downward, the holding force of the positioning means yields to either force or pressure and thereby permits the head 69 to move up or down.

In FIG. 5 is shown an exemplary arrangement of a plurality or multiplicity of cutting machines according to the present invention in a serial or parallel relationship for an efficient short-cycle operation. In this arrangement the hydraulic pressure in the hydraulic cylinders 73 of the motion speed regulating mechanism E is conveyed to the liquid in the ram holes 66 of impact hydraulic pressure cylinders 65 of the next machine and so forth until the hydraulic pressure transmitted to the liquid in the hydraulic cylinders 73 in the final stage is absorbed and buffered by dampers 77, e.g., cylindrical shock absorbers, hydraulic buffer cylinders or aureodampers. In the same manner as described in connection with the preceding embodiments, a hydraulic pressure from an apparatus such as a hydropunch, which gives rise to a high hydraulic pressure instantaneously, is exerted on the liquid in the cylinders 65 of the initial-stage machine and so forth so that a plurality of workpieces can be cut off in continuous operation through the effective utilization of the remaining part of the hydraulic pressure employed in the first stage.

In the embodiment shown in FIGS. 3-5, the total kinetic energy is determined by the moving part mass and speed of the head 69 inclusive of the cutting tool 70. Thus, it is possible to vary the mass of the total moving unit of the head 69, including the cutting tool, in order to maintain a substantially constant speed regardless of the amount of energy to be imparted to the cutting tool by the impact hydraulic pressure generator such as the hydropunch communicated with the cylinders 65. In other words, the weights 68 for the head 69 can be replaced as desired to control the mass and permit the cutting operation always with an optimum cutting speed which depends on the type of material to be handled, irrespective of the magnitude of energy given.

By way of example, it is assumed that the optimum tool speed for a certain grade of mild steel is about 20 meters per second, the initial cutting speed being 22 m./sec. and the final speed being 18 m./sec. and the weight of the moving assembly is $W$ kg, then the amount of work $E_1$ ($kgm$) to be utilized for the cutting purpose is $$E_1 = \frac{1}{2} \cdot \frac{W}{g} (22^2 - 18^2)$$

Therefore, only about one-third of the total kinetic energy $$\left(\frac{1}{2} \cdot \frac{W}{g} 22^2\right)$$

will suffice for the cutting purpose and the remaining two-thirds of the energy can be directly utilized as an input to a material-cutting machine in the ensuing stage, for example, an apparatus for cutting a round rod of a smaller diameter. Here again, the weight of the moving assembly is adjusted to realize an optimum cutting speed. The balance of energy unused in this stage is further employed as an input of still another cutting machine. In this way optimum cutting speeds are attained for the series of cutting machines regardless of the inputs to the respective apparatus, and thus the cutting operation can be carried out efficiently and economically.

In the operation of this apparatus, compressed air is first introduced through the inlet ports 79 into the air cylinders 71 to force the air pistons 72 upward (while the outlet ports 80 are open to the atmosphere). The connection members 75 coupled to these air pistons 72 are also raised together with the head 69, ram 67 and cutting tool 70 until they are kept in the raised position with the positioning means 25, 26, thus providing a wide space between the work receiver 4 and cutting tool 70. Next, a work is placed on the receiver 4, and the air inlet ports 79 of the air cylinders 71 are communicated to the atmosphere and the outlet ports 80 are connected to the compressed air lines. The air pistons 72 are then pneumatically forced down thereby bringing down the piston connection members 75, head 69, ram 67 and cutting tool 70 altogether, until they are again engaged with the positioning means 25, 26 at a point where the cutting tool 70 has approached the work. The cylinder 65 and hydraulic cylinders 73 are filled with a liquid such as water. As a high hydraulic pressure, i.e., thousands of atmospheres, is instantaneously applied in an impact fashion by a hydropunch communicated with the cylinder 65, the positioning means are tripped, and the ram 67 is hydraulically urged down with acceleration by an enormous force. Accordingly, the head 69 and the associated moving parts are moved down with a high velocity. Since the head 69 is provided with weights 68 of suitable size and weight and with a motion speed regulating mechanism E, the cutting tool 70 impinges on the work with an optimum speed for the cutting purpose, with the result that the work is shearingly cut off between the tool and the receiver 4 which exerts the shearing action. At this time the head 69 and the associated parts come down in the course of cutting, the openings 76 to the atmosphere render it possible for the hydraulic pistons 74 to have no serious back pressure resistance. Even after completion of the cutting operation, the hydraulic pistons 74 go on descending at a high velocity. As the lower ends of the hydraulic pistons reach the liquid and the openings 76 are closed, the liquid is rapidly compressed to a sufficiently high pressure to provide a resistance, which in turn stops the head 69 and thus permits an efficient cutting operation.

Figure 7:
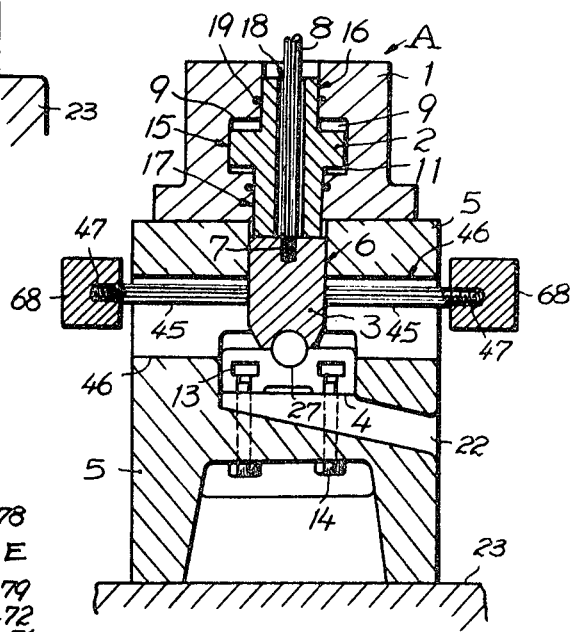

FIGS. 6 and 7 illustrate an embodiment which is the one described above and shown in FIG. 1 incorporating the means D for modifying the mass of the moving unit also described above. This embodiment permits the material cutting to be performed with an optimum speed, and is characterized by the possibility of attaining an optimum cutting speed which is determined by the material of the particular work to be cut off. In this embodiment the cutting blade 3 is provided with a rod 45 in such a manner that it extends therethrough and is slidably fitted in guide grooves or holes 46 formed in the base 5 and is extended out of the base 5. The rod is formed with threaded or otherwise engageable portions 47, on which weights 68 are mounted detachably and replaceably. The rest of the construction is the same as that of the embodiment represented in FIG. 1.

Figure 8:
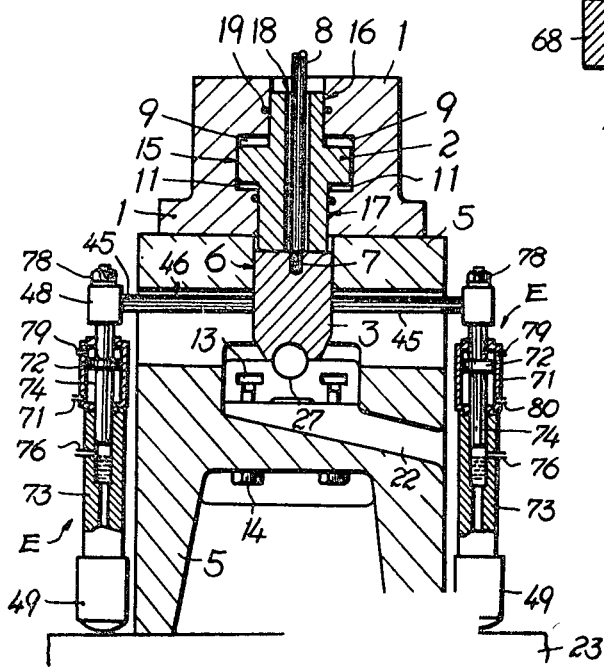

In FIG. 8 a motion speed regulating mechanism E wherein the additional means of weights 68 in the embodiment described immediately above are replaced by dampers 49 is arranged through connecting members 48 at the front ends of the rods 45 which is provided through the cutting blade 3. The motion speed regulating mechanism E has the came construction as the embodiment above described. The connecting members 48 may be provided with weights (not shown) interchangeably as means for modifying the mass of the moving unit. While the embodiment is shown as comprising workholding means B and compression means C, either or both of these means may be omitted depending on the application of the cutting machine. It is also considered possible to arrange a plurality of cutting machines as embodied in FIG. 5 or to freely choose and combine suitable embodiments together. For an effective cutting operation, the base 23 in each embodiment that is to receive the reaction force due to shearing of the work is so constructed that the work receiver 4 is rigidly supported and is held immovably against the cutting impact. It is further contemplated to construct the kinetic mass modifying means D and motion speed regulating means E so that they can be balanced with respect to the cutting blade 3 and/or head 69 and other associated moving parts.

In any event, useful means for cutting the work with the application of a composite force rather than a simple shearing force can be combined as desired.

What is claimed is:

1. A material-cutting machine comprising fluid-actuated cutting means for shearing through a workpiece along a shear plane; fluid transmission means coupled to said cutting means; impulse pressure generating means coupled to said fluid transmission means for the application of a high-pressure impulse to said cutting means for the actuation thereof; said cutting means including a displaceable unit incorporating a cutting tool for shearing through said workpiece, said displaceable unit being displaceable in response to said high-pressure impulse; a fluid-actuated motion control means coupled to said displaceable unit for controlling the speed at which said cutting tool shears through said workpiece, said motion control means including fluid cylinder means; and at least one further fluid-actuated cutting means for shearing through a second workpiece along a shear plane, said further cutting means being coupled to said cylinder means for receiving a high-pressure impulse therefrom for actuation thereby, whereby said first-mentioned and second cutting means are substantially simultaneously actuated in response to said impulse pressure generating means.

2. A material-cutting machine as recited in claim 1, and including positioning means coupled to at least the displaceable unit of said first-mentioned cutting means for selectively stopping and holding said movable unit at a first position at which said cutting tool is positioned adjacent to said first-mentioned workpiece preliminary to shearing therethrough, and a second position spaced from said first position for permitting feeding and discharge of said first-mentioned workpiece relative to said cutting tool.

3. A material-cutting machine as recited in claim 1, wherein said displaceable unit of at least said first cutting means includes adjustable mass means for selectively adjusting the mass of said displaceable unit for the selective adjustment of the feed of shearing, whereby said speed of shearing may be coordinated with the material of said workpiece.

4. A material-cutting machine as recited in claim 1, including a plurality of further cutting means, each for shearing through its respective workpiece along a shear plane, each of said further cutting means having a displaceable unit incorporating a cutting tool for effecting shearing of the respective workpieces; and a plurality of further fluid-actuated motion control means, each of said further motion control means being coupled with one of said displaceable units for the control of the speed of shearing of each respective workpiece, said first-mentioned and further cutting means being aligned in stages with the cylinder means of the motion control means associated with each cutting means being coupled to the cutting means of the next stage for the actuation of each further cutting means in response to the high-pressure fluid impulse in the cylinder means of the motion control means of the previous stage, whereby each of said first-mentioned and further workpieces are substantially simultaneously sheared through in response to said impulse pressure generating means.

* * * * *

UNITED STATES PATENT OFFICE
CERTIFICATE OF CORRECTION

Patent No. 3,636,808      Dated January 25, 1972

Inventor(s) HIROSHI TOMINAGA

It is certified that error appears in the above-identified patent and that said Letters Patent are hereby corrected as shown below:

Inventor   Hiroshi Tominaga

Signed and sealed this 12th day of September 1972.

(SEAL)
Attest:

EDWARD M. FLETCHER, JR.                ROBERT GOTTSCHALK
Attesting Officer                      Commissioner of Patents